United States Patent [19]

Wright

[11] 3,913,460
[45] Oct. 21, 1975

[54] IMPACT DAMPING MEANS FOR FLUID CYLINDERS
[75] Inventor: Lee A. Wright, Centerville, Ohio
[73] Assignee: Mosier Industries, Inc., Brookville, Ohio
[22] Filed: Jan. 15, 1974
[21] Appl. No.: 433,475

Related U.S. Application Data
[63] Continuation-in-part of Ser. No. 279,455, Aug. 10, 1972, abandoned.

[52] U.S. Cl. .................. 92/85; 92/243; 92/249; 277/205
[51] Int. Cl.$^2$ ........................... F01B 11/02
[58] Field of Search ....... 92/85, 243, 244, 248, 249; 277/205

[56] References Cited
UNITED STATES PATENTS

| | | | |
|---|---|---|---|
| 2,815,992 | 12/1957 | Rodgers | 92/244 X |
| 2,963,330 | 12/1960 | Arnes | 277/205 X |
| 2,994,571 | 8/1961 | Peras | 92/243 X |
| 3,037,781 | 6/1962 | Peras | 92/243 X |
| 3,136,228 | 6/1964 | Dailey | 92/85 |
| 3,267,815 | 8/1966 | Ortman et al. | 92/85 X |
| 3,354,794 | 11/1967 | Dailey | 92/243 |
| 3,388,638 | 6/1968 | Brinkel | 277/205 X |
| 3,465,650 | 9/1969 | Gluck | 92/85 |

Primary Examiner—Martin P. Schwadron
Assistant Examiner—Abraham Hershkovitz
Attorney, Agent, or Firm—J. Warren Kinney, Jr.

[57] ABSTRACT

The impact damping means comprises one or more resilient rubber-like ring members arranged either upon the heads or upon the piston of a fluid cylinder, to cushion the piston stroke impact at the end of a stroke, and to induce concurrently a sealing function enhancing the fluid cylinder performance. In one form of the ring member, one or more relief ports may be incorporated therein to prevent excessive build-up of fluid pressure between portions of the ring member and a cylinder head at the end of a stroke, and to enhance breakaway upon reversal of the piston movement.

33 Claims, 13 Drawing Figures

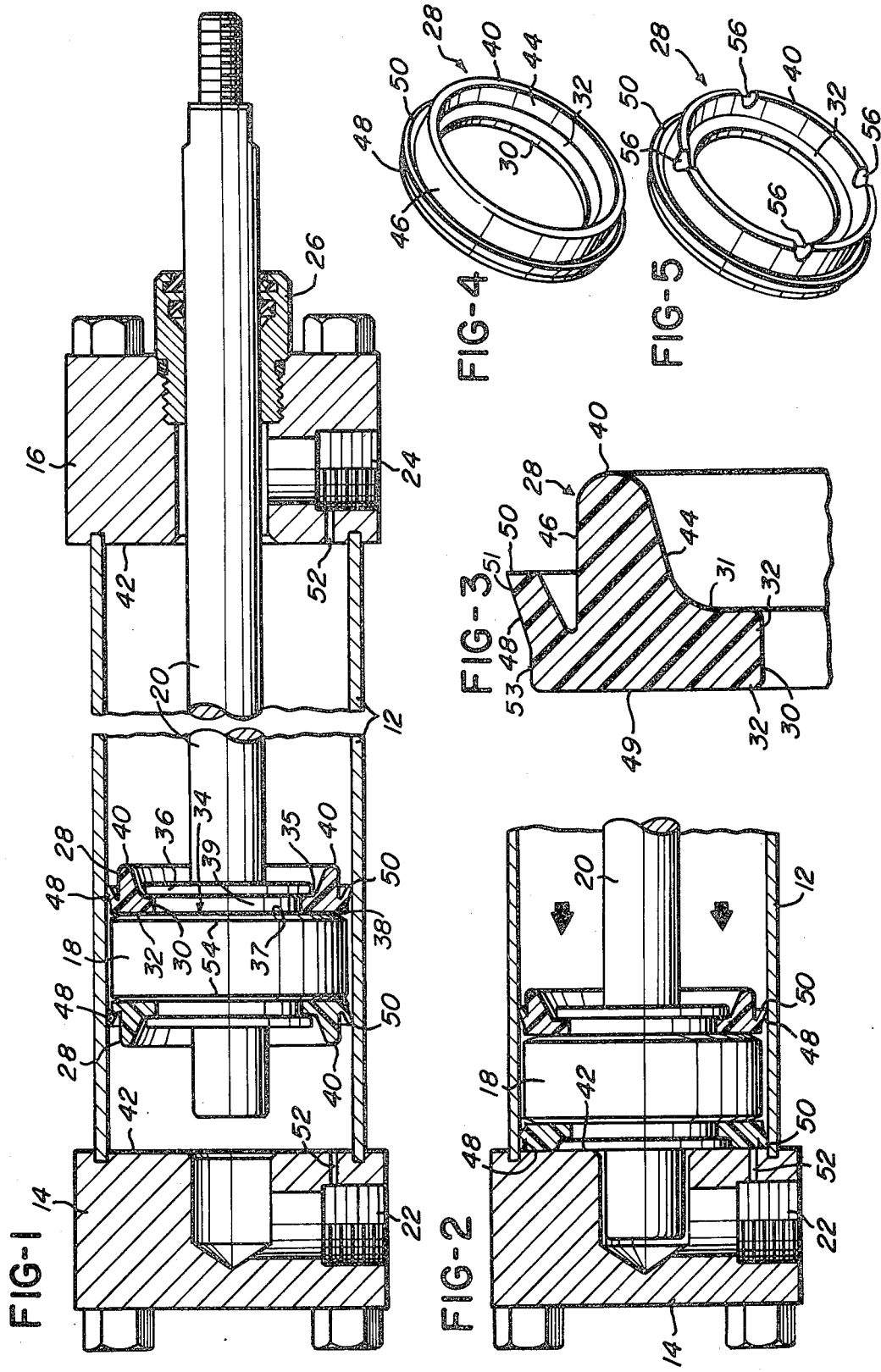

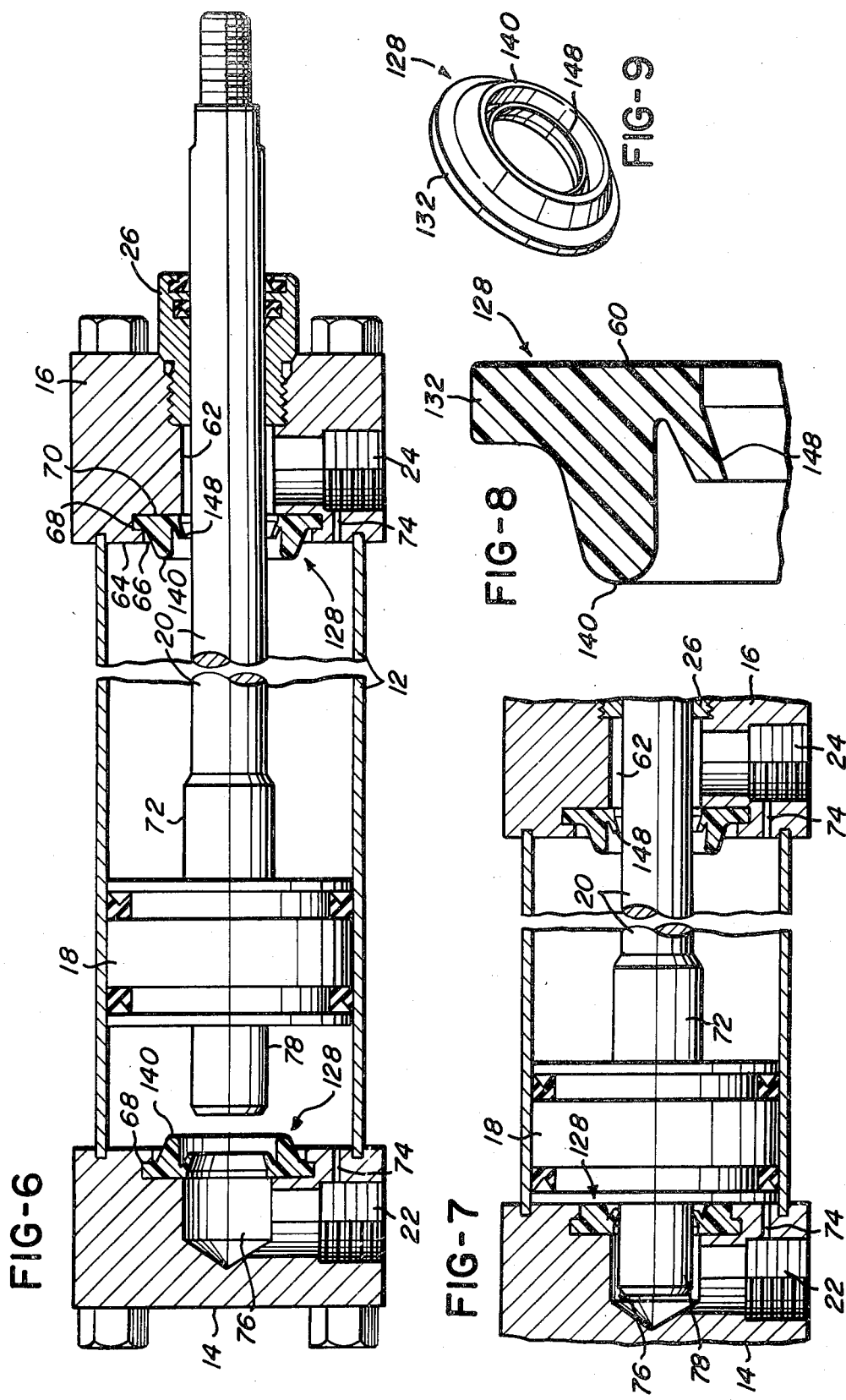

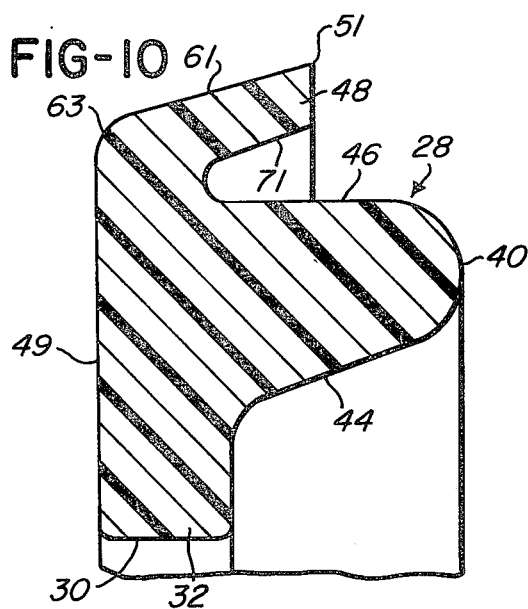
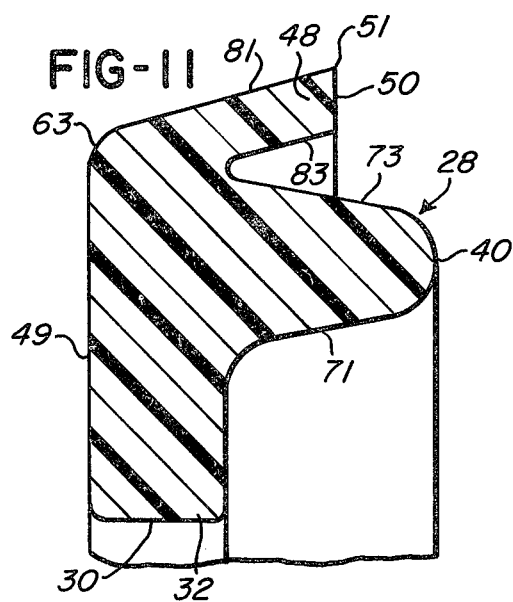
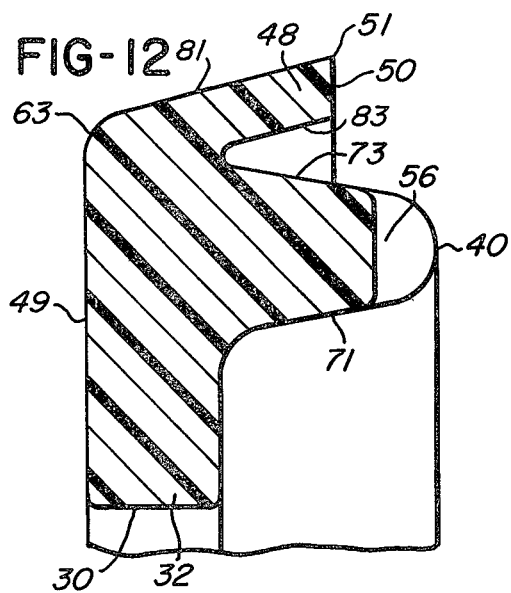
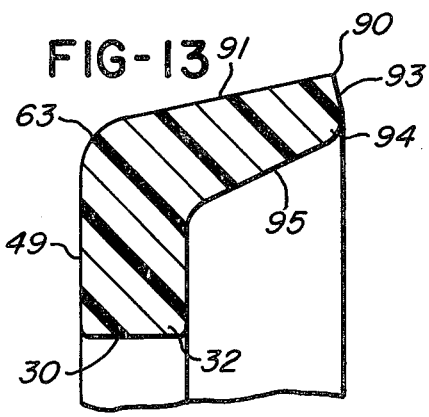

IMPACT DAMPING MEANS FOR FLUID CYLINDERS

This application is a continuation-in-part of my co-pending patent application, Ser. No. 279,455, entitled: IMPACT DAMPENING MEANS FOR FLUID CYLINDERS, filed Aug. 10, 1972 now abandoned.

BACKGROUND OF THE INVENTION

The prior art reveals various proposals to dampen or cushion the impact of pistons upon the heads of power cylinders, at the ends of the piston stroke, as evidenced by the U.S. Pats. listed below. In differing forms, resilient bumpers were applied to the piston itself, or to the heads of the cylinder containing the piston. The devices of the prior art, however, are subject to improvements to enhance their effectiveness, longevity, and practicality of use, as will be explained hereinafter. As a general rule, the prior art damping means do not permit full travel of a piston within a cylinder.

The most relevant prior art is believed to be represented by the U.S. Pat. No. 3,465,650 which discloses shock absorbing means for a piston and cylinder and which, as best illustrated in FIGS. 8–11 thereof includes resilient, impact absorbing means constituting and defined by a plurality of individual pockets in and which completely cover the transverse face of said means.

Other, less relevant prior art of which applicant is aware is disclosed in U.S. Pat. Nos. 3,440,930; 3,208,353; 3,143,933; 3,136,228; 3,054,385; 2,984,529; 2,899,936; 2,802,451; 2,875,730; 2,872,901; 2,719,510; and 2,681,581.

SUMMARY OF THE INVENTION

In accordance with the present invention, alternative means are provided for damping or cushioning piston impact, using specially contoured open rings which have certain characteristics in common. That is, both forms of the ring incorporate a resilient bumper portion and a resilient annular sealing lip, with provision made for a controlled entrapment of cylinder fluid as the piston approaches a home position at the end of a stroke, to enhance the cushion effect. Also, in an alternative form, the ring may be provided with one or more radial ports or relief passageways, to eliminate damaging pressure build-up between the cylinder head and the piston, and to control vacuum resistance to breakaway on a reverse stroke of the piston.

BRIEF DESCRIPTION OF THE DRAWINGS

FIG. 1 is a vertical longitudinal cross section of a fluid cylinder embodying the impact damping means of the invention as applied to the piston of the fluid cylinder, the piston being shown in an intermediate position between the cylinder heads.

FIG. 2 is a fragmentary view of FIG. 1, showing the piston cushioned against one of the cylinder heads.

FIG. 3 is a fragmental cross section on an enlarged scale, showing an impact damping ring of FIG. 2.

FIG. 4 is a perspective view of the ring.

FIG. 5 is a perspective view of a modified form of the ring.

FIG. 6 is a vertical longitudinal cross section of a fluid cylinder embodying the impact damping means as applied to the heads of the fluid cylinder, the piston being shown in an intermediate position relative to the cylinder heads.

FIG. 7 is a fragmentary view of FIG. 6, showing the piston cushioned against an impact means of the cylinder head.

FIG. 8 is a fragmentary cross section on an enlarged scale, showing the impact means of FIGS. 6 and 7.

FIG. 9 is a perspective of view of the impact means of FIGS. 6, 7 and 8.

FIG. 10 is a fragmental cross section on an enlarged scale showing a modification of the impact damping ring of FIG. 3.

FIG. 11 is a fragmental cross section on an enlarged scale showing another modification of the damping ring of FIG. 3.

FIG. 12 is a view illustrating the ring of FIG. 11 with the modification shown in FIG. 5.

FIG. 13 is a fragmental cross section on an enlarged scale showing a modification of the ring of FIG. 3.

DESCRIPTION OF THE PREFERRED EMBODIMENTS

Common elements illustrated upon the drawings are: the fluid cylinder 12 having heads or end elements or walls 14,16; a piston 18 fixed upon the reciprocable piston rod 20; ports 22 and 24 through which a fluid moves to activate the piston and rod; and a packing gland 26 through which the piston rod reciprocates. The operating fluid may be liquid or gaseous in form, and will be fed under pressure to either port 22 or 24, depending upon the direction of movement to be imparted to the piston and rod. As will be understood, in accordance with common practice, one of the head ports will exhaust fluid from one end of the cylinder while the other port directs pressured fluid into the opposite end thereof.

With reference to FIGS. 1 through 5, the numerals 28 indicate combination seal and impact damping means in the form of bumper rings, applied to the piston at opposite ends thereof. The rings are identical to one another, so a description of one will suffice for the other also. As shown, ring 28 has a front face 31, a rear face 49, an outer surface 53, and an inner surface defining a large central opening 30 circular of shape, and an inwardly directed annular mounting flange 32 is on the inner surface. The piston has an annular piston groove or recess 34 formed in the material of the piston, and the volume of the recess is at least as great as the volume of the ring. The piston groove 34 has a side wall 35 and a back wall 37 and an annular mounting groove 39 is in the side wall. The groove is defined by spaced parallel annular flanges 36 and 38, these being outer and inner flanges, respectively, and the groove is adapted to snugly receive the flange 32 of the ring 28, with the rear face of the ring engaged against the rear wall of the recess.

Ring 28 is formed or molded of resilient rubber-like material, and it may therefore be stretched and distorted as required, in seating or unseating it with respect to piston groove 34.

Adjacent to mounting flange 32, the thickness of ring 28 is increased to provide an annular continuous resilient bumper 40 that extends a substantial distance beyond flange 32, in the direction of the ring axis. The crest or leading edge of the bumper is adapted to yieldingly contact an inner face 42 of a cylinder head, for the purpose of damping or absorbing shock caused by a forceful impact of the face of the piston against the inner face 42 of the head. In a preferred construction, the bumperr has an interior annular wall 44 (FIG. 3), which is inclined relative to an external annular wall 46, resulting in a reduction of material at the crest of the bumper. This produces a progressively increasing resistance to impact in the body of the bumper, from the crest thereof to the bumper base, which latter includes mounting flange 32.

The base of the bumper, denoted 49, is coplanar with annular flange 32 and is disposed approximately normal to external wall 46. Integral with the bumper, and flared outwardly from wall 46, is an annular external sealing lip 48. Lip 48 is flexible and resilient, and may therefore be crowded against the inner wall of cylinder 12 during reciprocation of the piston, to form a fluid seal. The sealing lip base 49 is common to the base of bumper 40, and its leading edge 50 extends in the general direction of the bumper. It will be noted, however, that the crest 40 of the bumper projects well beyond the leading edge 50 of the sealing lip; moreover, the sealing lip projects no farther than the outer face of piston flange 36.

As illustrated upon FIG. 2, a forceful advancement of piston 18 to the left, causes the annular bumper 40 to flatten yieldingly against the inner face 42 of cylinder head 14, thereby cushioning the impact. When the volume of that portion of the bumper which extends beyond the face of the piston is equal to or less than available void volume or recess in the face of the piston, the bumper will absorb, impact and still permit the face of the piston to home solidly against the inner face 42 of the cylinder head, FIG. 2. As before noted, the sealing lip at 50 preferably will not bear against the head, in the fully advanced condition of the piston.

The reference numerals 52 indicate bleed holes between the inner face of a head and its fluid port, serving to relieve fluid that may be trapped during cushioning of the piston advancement. The bleed holes, if desired, may be fitted with needle valves or equivalent control means for purpose of flow variation, and consequent cushioning adjustment.

Referring to FIG. 1, it is noted that flange 38 of the piston is provided with an inclined or chamfered annular shoulder 54 of limited width, which in the absence of substantial fluid pressure acting against the sealing lip, is normally spaced from the overhanging peripheral edge of the base portion of the sealing lip. However, when substantial fluid pressure is imposed upon the leading edge 50 of the sealing lip, the pressure will expand the lip against the cylinder wall and at the same time flex the peripheral edge of the base portion thereof against the inclined shoulder 54. Such flexing of base portion occurs repeatedly as the piston movement changes direction and serves to prevent the leading edge of the sealing lip from taking a set radially inwardly toward the bumper, such as would eventually induce leakage of fluid past the sealing lip.

FIG. 5 illustrates a slight modification of the bumper ring of FIG. 4, involving simply the formation of one or more refief ports 56 disposed transversely across the crest or leading edge of the bumper 40. Said ports may be in the form of radial notches, grooves, or slits or the like. Such ports prevent excess pressure build-up against the sealing lip during impact, and will serve also as a vacuum break during piston breakaway, precluding the possibility of displacement of the ring from the piston groove.

In the modification, FIGS. 6 through 9, the impact damping means is similar to that previously described, in that it comprises a resilient rubber-like ring 128 having a continuous bumper 140, a sealing lip 148, and a mounting flange 132. These elements, however, are reversed as to relative position with respect to the ring of FIG. 3 in that the sealing lip 148 is disposed internally rather than externally of the ring, and the mounting flange 132 is external. The bumper and the sealing lip have a common base 60 which is integral and coplanar with mounting flange 132.

In practice, the impact damping ring 128 is mounted upon a cylinder head such as 14 or 16, or upon both heads, rather than upon the piston. Since the rings and their mode of mounting are identical at both heads, a description of one will suffice for the other also.

Referring to cylinder head or end member 16, it is noted that a bore 62 which accommodates packing gland 26, loosely accommodates also the piston rod 20. Bore 62 is in fluid communication with port 24, which provides for transfer of fluid at one side of the piston. At the inner face 64 of head 16, the head is counterbored at 66, and undercut at 68 to provide an annular channel or groove in which the external mounting flange 132 of the ring may be snugly fitted. The diameter of groove 68 approximates that of the mounting flange 132. Groove 68 is defined by a planar abutment area 70 which backs up the base portion 60 of the ring.

It is noted that the annular bumper 140 extends into the cylinder beyond head face 64, wereas the annular leading edge of sealing lip 148 does not so extend. The sealing lip is seen to surround without contact, the piston rod 20 so that operating fluid may pass freely into an from the cylinder through port 24.

From the foregoing explanation, it will be apparent that piston 18 in forcefully advancing toward head 16, will strike the resilient leading edge of bumper 140, thereby to compress the bumper with the desired shock-absorbing effect. At approximately the same time, the rod spear 72 of enlarged diameter, will slidingly contact the sealing lip 148 and form a seal therewith to prevent displacement of fluid through ring 128. This of course results in entrapment of fluid between the piston and the head, the increased pressure of which may be relieved gradually through bleed hole 74. The face of the piston may home solidly against the inner wall of the cylinder head if the volume of that portion of the bumper which extends beyond face 64, is no greater than the available void-volume or recess within the area of the piston circumscribed by the touching bumper. The capacity of bleed hole 74 may be regulated by a needle valve or equivalent control means, if desired.

At head 14, the bumper and sealing actions are the same as above described in connection with head 16, the only difference being that head 14 has a closed bore 76 which accommodates the piston rod spear 78 exclusive of the main portion of the rod. Spear 78 in entering the bore 76, makes sealing contact with the annular sealing lip of the adjacent bumper ring, before piston 18 strikes the bumper area thereof. Fluid entrapped between the seal and the piston may be relieved through a bleed hole 74 or equivalent means, as previously explained. As suggest by FIG. 7, the piston upon cushioning against the bumper of impact ring 128, may home against, that is, the face of the piston will contact the inner face of the cylinder head, if desired. Homing may be prevented, of course, by increasing the size or volume of the bumper portion, or by eliminating the bleed hole 74, or otherwise.

The impact element 128, like element 28 of FIG. 5, may desirably be provided with relief ports or notches such as 56, if a reduction of pressure upon the sealing lip after impact is thought necessary or desirable. The wall of bumper 140 may be characterized by a gradually increasing thickness in the direction of base 60, to augment resistance to the piston advancement progressively, substantially as explained in the description of FIGS. 1–5. Whether the impact element is applied to the piston or to the cylinder head, its function is the same.

FIG. 10 discloses a modification of the damping means of FIG. 3, wherein outer surface 61 of the annular, external sealing lip 48 is inclined, or tapered, in a substantially straight line from forward tip 51 to rounded corner 63 which is tangent to surfaces 61 and 49. Surfaces 44 and 46 of the bumper 40 of FIG. 10 correspond to similarly numbered surfaces of the bumper of FIG. 3. It will be noted that in FIG. 3 the outer surface of the external sealing lip 48 includes a downwardly inclined portion 51 which does not extend to surface 49, but terminates in an annular shoulder portion 53 which is substantially parallel with surface 30.

With particular reference now to FIG. 10, it should be noted that uniformly satisfactory results have been obtained in those instances in which surface 61 of the sealing lip is inclined about 15°, and surface 71 is inclined about 20° with reference to surface 30 of the combination impact and sealing ring member, and wherein surface 46 of the bumper 40 is substantially parallel with surface 30 and surface 44 is inclined about 20° with reference to surface 30.

By thus providing an elongate, outer, straight, tapered surface 61 to the annular external sealing lip 48, the overall efficiency and useful life of the combination impact and sealing ring member is substantially increased, since temperature rises, in the sealing ring member, as the result of friction between contacting surfaces of the sealing lip and the inside diameter of cylinder 12 is substantially reduced, particularly when the ring member is utilized in applications in which rapid or high speed cycling of the piston occurs. The seal illustrated in FIG. 10 is particularly adapted for use in cylinders having a bore diameter of 5 inches or larger.

FIG. 11 discloses a modification of the combination impact and sealing ring member of FIG. 10 for use in cylinders having bores of a diameter ranging from 1.5 to 4 inches. The outer surface 81 of the sealing lip is tapered in the same manner as surface 61 of FIG. 10, however, surface 83 is inclined about 15° with reference to surface 30. The overall shape of bumper 40 of FIG. 11 differs from the shape of the bumper of FIG. 10 in that the bumper of FIG. 11 is defined by inclined surfaces 71 and 73, each of which are inclined about 10° with reference to surface 30.

FIG. 12 is a sectional view of a seal of FIG. 11 wherein a relief port 56 has been disposed transversely across the crest or leading edge of the bumper 40, such as, by way of example, is illustrated at 56 in FIG. 5.

FIG. 13 discloses a modification of a combination impact and sealing ring member which has been particularly designed for use with cylinders having bores of a diameter of 1⅛ inch and less wherein the sealing lip and bumper collectively comprise a single, axially projecting member having common surfaces 91 and 95. Uniformly satisfactory results have been obtained in those instances in which surface 91, which tapers in a substantially straight line from top 90 to rounded corner 63 which is tangent to surface 91 and 49, is inclined at an angle of approximately 12° with respect to reference surface 30. Forward edge 93 tapers downwardly and outwardly in a substantially straight line from tip 90 to rounded corner 94 which is tangent to surfaces 93 and 95, wherein surface 95 is inclined about 25° with reference to surface 30.

In those instances in which the combination impact and sealing ring member of FIG. 13 is utilized, it should be understood that the rounded portion of nose 94 comprises the forward portion of the bumper and that said rounded surface will initially engage the face of the end wall of a cylinder head and thereby initially absorb the piston impact; and, as the sealing member is progressively compressed and distorted as the face of the piston approaches and contacts the inner face of the end wall of the cylinder, outer surface 91 will expand and snugly engage te inner surface of the wall of a cylinder for an appreciable distance rearwardly of forward portion 94.

From the foregoing, it will be noted that in all forms of the invention the combination impact damping and sealing ring means constitutes a one-piece resilient ring having a plurality of continuous annular surfaces, certain of which define a resilient sealing lip, others of which define a single, annular, continuous resilient bumper, others of which define a central opening 30 and an annular mounting flange 32.

What is claimed is:

1. Impact damping means for a piston in a cylinder, comprising a cylinder having opposite end wall means, a piston means in said cylinder reciprocable toward and away from said end wall means, said piston means and at least one of said end wall means having cooperatively interengageable stop surfaces thereon defining at least one positive limit of travel of said piston means in said cylinder, one of said means having a recess therein having a side wall and a back wall, said side wall having an annular mounting groove therein; a one-piece, circular, resiliently deformable combination impact and seal ring in said recess, said ring having an outer surface and an inner surface and front and rear faces, an annular, planar, radially extending mounting flange on one of said inner and outer surfaces and having one side thereof coplanar with the rear face of the ring, said flange releasably received in said groove, means for releasably securing said ring in said recess with said rear face of the ring engaged against the rear wall of the recess, an annular, continuous, axially projecting sealing lip on said ring projecting axially no farther than the stop surface containing said recessed means, and a single, annular, continuous, resiliently deformable bumper on said ring between said sealing lip and said mounting flange and projecting axially substantially beyond said sealing flange and projecting axially substantially beyond said sealing lip and axially outwardly of said recess beyond said stop surface containing said recessed means to engage the other of said means to dampen impact between said stop surfaces at the limit of travel of said piston means, the recess having a volume at least as large as the volume of said ring so that contacting engagement between said stop surfaces results in compacting of said ring and the deformed bumper into said recess, to thus enable the piston means to consistently travel its full stroke in said cylinder.

2. Impact damping as in claim 1, wherein the bumper has a leading edge outwardly of said recess beyond the stop surface on said one means and a base in said recess, said bumper having an increased cross-sectional size at its base, so that the bumper offers increasing resistance to impact between said stop surfaces after initial engagement of the leading edge of the bumper with the stop surface on the other of said means.

3. Impact damping means as in claim 1, wherein said piston means and each of said end wall means have mutually interengageable stop surfaces thereon defining opposite limits of travel of said piston means in said cylinder, and the impact and seal ring is operatively associated with the piston means and each end wall means to dampen impact between the piston means and each of the end wall means.

4. Damping means as defined by claim 1, wherein said mounting flange, said sealing lip, and said bumper have a common base in the plane of the mounting flange.

5. Damping means as defined by claim 1, wherein the bumper has a leading edge having at least one transverse relief port incorporated therein.

6. Damping means as defined by claim 1, wherein said bumper includes a side wall which is substantially normal to the plane of the mounting flange, and wherein said sealing lip circumscribes and is inclined away from said side wall.

7. Damping means as defined by claim 1, wherein said bumper includes side walls which converge from said base, and wherein said sealing lip circumscribes and is inclined away from said bumper.

8. Damping means as defined by claim 1, wherein said bumper includes side walls which converge from said base, and wherein said sealing lip is circumscribed by and inclined away from said bumper.

9. The combination as called for in claim 1, which includes means operative incident to an entrapment of cylinder fluid between the annular bumper and the inner wall of the cylinder head for relieving pressure upon the entrapped fluid as the piston approaches contact with the inner wall of said cylinder, said means comprising a bleed opening in the cylinder head.

10. A ring as called for in claim 1, wherein the recess means are located in the said piston means.

11. A sealing ring as called for in claim 1, wherein the recess means are located in the said end wall means.

12. Impact damping means for a piston in a cylinder, comprising a cylinder having opposite end wall means, a piston means in said cylinder reciprocable toward and away from said end wall means, said piston means and at least one of said end wall means having cooperatively interengageable stop surfaces thereon defining at least one positive limit of travel of said piston means in said cylinder, one of said means having a recess therein including an annular mounting groove; a onepiece, circular, resiliently deformable combination impact and seal ring in said recess said ring having an inner surface, an outer surface and front and rear faces, said ring having an annular mounting flange thereon received in said groove and having one side thereof coplanar with the rear face of the ring, means for releasably securing said ring in said recess, an annular, continuous, axially projecting sealing lip on said ring projecting axially no farther than the stop surface containing said recessed means, and a single, annular, continuous, resiliently deformable bumper on said ring between said sealing lip and said mounting flange and projecting axially substantially beyond said sealing lip and axialy outwardly of said recess beyond said stop surface containing said recessed means to engage the other of said means to dampen impact between said stop surfaces at the limit of travel of said piston means, the recess having a volume at least as large as the volume of said ring so that contacting engagement between said stop surfaces results in compacting of said ring and the deformed bumper into said recess, to thus enable the piston means to consistently travel its full stroke in said cylinder.

13. Impact damping means for a piston in a cylinder having opposite end walls, a piston rod reciprocably mounted in said cylinder, a piston secured to and carried by said piston rod, interengageable stop surfaces on said piston and said end walls defining opposite limits of travel of said piston in said end walls defining opposite limits of travel of said piston in said cylinder, the end walls of said cylinder having an annular mounting groove therein; a one-piece, circular, continuous, resilient, combination impact-dampening and sealing ring having a circular opening therein, an outer surface, a front face, an annular planar, radially extending mounting flange on said outer surface, and having one side thereof coplanar with said rear face; an annular, continuous, resilient sealing lip in said circular opening angularly inclined toward the axis of said ring; and a single, continuous, annular, resiliently deformable, axially projecting bumper on said front face between said sealing lip and said mounting flange, coaxial with said opening and projecting axially substantially beyond said sealing lip; said annular mounting flange releasably received in the annular mounting groove of a cylinder end wall with said sealing lip and bumper projecting toward the interior of a cylinder; said sealing lip adapted to sealingly engage portions of a piston rod introduced thereinto, said sealing lip terminating short of said cylinder stop surface so that said sealing lip does not engage the stop surface of the piston at the limit of travel of said piston; said bumper being disposed between said sealing lip and said mounting flange and coaxial therewith, said bumper engageable with the stop surface of said piston to dampen the impact of said piston against the end wall of the cylinder while permitting contact between the stop surfaces of said piston and cylinder.

14. A device as called for in claim 13, wherein the recesses in the end walls of the cylinder have a volumetric capacity sufficient to receive the mounting flange and those portions of the bumper which are compacted and deformed incident to contact with the stop surface of the piston.

15. The combination as called for in claim 13, wherein the annular sealing lip defines the central opening of said combination impact damping and sealing ring; spear portions at and projecting from the opposite stop surfaces of the piston for providing a fluid seal between the sealing lips and the spear portions incident to entry of the spear portions into the central opening of said ring.

16. The combination as called for in claim 15, wherein the spear portions on that side of the stop surface of the piston which is remote from the piston rod comprise forwardly projecting extension in axial alignment with the piston rod, and wherein one end wall of the cylinder includes an axially aligned, spear receptive bore which projects inwardly beyond and centrally of the annular mounting groove in said end wall of the cylinder, and wherein the spear portion which is on the piston-rod side of the piston stop surface comprises an enlarged portion of the piston rod, and wherein the other end wall of said cylinder includes an axially enlarged, spear receptive bore which projects inwardly beyond and centrally of the annular mounting groove in said end wall of the cylinder.

17. Impact damping means for a piston in a cylinder, said damping means comprising a one-piece, circular, resilient combination impact-damping and sealing ring having a circular opening therein and inner and outer surfaces and a front face and a substantially smooth, planar rear face; an annular, planar, radially extending mounting flange on one of said surfaces and having one side thereof coplanar with said rear face; an annular, resilient sealing lip on the other of said surfaces and angularly inclined relative to the axis of said ring; and a single, continuous, annular, resiliently deformable, axially projecting bumper on said front face between said sealing lip and said mounting flange coaxial with said opening and projecting axially substantially beyond said sealing lip, for use in a piston and cylinder to engage between the piston and cylinder to absorb impact between a piston and cylinder and yet to enable contact between the piston and cylinder so that the piston has a constant limit of travel in the cylinder, said mounting flange being resiliently yieldable to enable said flange to be readily positioned in and removed from a flange mounting groove.

18. A combination impact-damping and sealing ring for fluid cylinders comprising: a circular ring of resilient, rubber-like material having an outer peripheral edge defining a circumference of the ring and an inner peripheral edge defining a central opening therethrough, a front fact and a rear face an annular, planar radially extending mounting flange adjacent one peripheral edge and having one side thereof coplanar with said rear face, an annular, continuous, axially projecting sealing lip adjacent the other peripheral edge, and a continuous, annular, resilient bumper intermediate said sealing lip and mounting flange, projecting in the same direction of and axially beyond said sealing lip.

19. A combination impact-damping and sealing ring as called for in claim 18, wherein the planar mounting flange is adjacent the inner peripheral edge of said ring.

20. A combination impact-damping and sealing ring as called for in claim 18, wherein the planar mounting flange is adjacent the outer peripheral edge of said ring.

21. A combination impact-damping and sealing ring as called for in claim 18, wherein said mounting flange, sealing lip and bumper have a common base in the plane of the mounting flange.

22. A combination impact-damping and sealing ring as called for in claim 21, wherein said bumper includes a side wall which is adjacent and substantially normal to the plane of the mounting flange.

23. A combination impact-damping and sealing ring as called for in claim 18, wherein the bumper has a leading edge having at least one transverse relief port therein.

24. A combination impact-damping and sealing ring as called for in claim 18, wherein the annular sealing lip defines the diameter of said central opening.

25. A combination impact-damping and sealing ring as called for in claim 18, wherein the annular sealing lip defines the outer circumference of the ring.

26. A combination impact-damping and sealing ring as called for in claim 18, wherein the outer surface of the sealing lip is inclined an an angle of about 15° from the axis of the ring, and wherein the juncture between said inclined surface and a surface of the planar mounting flange is defined by a rounded edge which is tangent to the edges of each of said surfaces.

27. A combination impact-damping and sealing ring as called for in claim 26, wherein the inner surface of the sealing lip is inclined at an angle of about 20° from the axis of the ring.

28. A combination impact-damping and sealing ring as called for in claim 27, wherein the bumper is defined by a first substantially straight surface adjacent the inner inclined surface of the sealing lip in substantial parallelism with the axis of the ring and a second surface which is inclined downwardly and away from leading edge of said bumper at an angle of about 20° relative to the axis of the ring.

29. A combination impact-damping and sealing ring as called for in claim 26, wherein the sealing lip terminates in a leading edge disposed in a plane which is substantially normal to the axis of said ring.

30. A combination impact-damping and sealing ring as called for in claim 18, wherein the inner surface of the sealing lip is inclined at an angle of about 15° from the axis of the ring, and wherein the bumper is defined by a pair of substantially straight surfaces which diverge from the leading edge of the bumper, said surfaces being inclined about 10° relative to the axis of the ring.

31. A combination impact-damping and sealing ring for fluid cylinders comprising a circular ring of resilient rubber-like material having an outer peripheral edge defining a circumference of the ring and an inner peripheral edge defining a central opening therethrough, a front face and a rear face an annular radially extending planar mounting flange adjacent said inner peripheral edge and having one side thereof coplanar with said rear face, an annular, continuous, axially projecting combination sealing lip and bumper adjacent the other peripheral edge, wherein said sealing lip and bumper includes a sealing portion having upwardly and outwardly inclined inner and outer surfaces, and a bumper portion between said sealing portion and said mounting flange and having upwardly and outwardly inclined inner and outer surfaces, said combination sealing lip and bumper terminating in a leading edge which extends downwardly and outwardly from the circumferential edge of the outer surface of the sealing lip portion and wherein the outer lower portion of said outer surface terminates in a rounded surface which is tangent to said inclined surface and the inner surface of said combination sealing lip and bumper.

32. A combination inpact-damping and sealing ring as called for in claim 31, wherein the outer surface of said sealing lip portion is inclined at an angle of about 12°, and wherein the inner surface of said bumper portion is inclined at an angle of about 15° with reference to the axis of said ring, and wherein said leading edge is inclined at an angle of about 20° relative to a plane normal to the axis of the said ring.

33. A combination impact-damping and sealing ring comprising:
   a. a circular, annular, ring of resilient, rubber-like material having a substantially flat, radially extending, planar rear surface,
   b. an annular, continuous, radially extending mounting flange defined by a pair of substantially parallel, planar, laterally spaced front and rear walls one end of each of which terminate in an axial end wall which defines one peripheral edge of the ring, and wherein said rear wall of said mounting flange is co-planar with the rear surface of the ring,
   c. an annular, continuous sealing lip defining the other peripheral edge of the ring, wherein said lip is inclined away from the axial end wall of the mounting flange and terminates in a continuous, free, outer, forward end, and,
   d. an annular, continuous, axially projecting bumper intermediate the sealing lip and mounting flange, terminating in a free, outer, continuous forward end which projects beyond the forward end of the sealing lip.

* * * * *